INVENTORS
Donald J. Yeadon, Leland W. Hooker
and Hereford Garland
BY
Barnes, Kisselle, Laughlin & Raisch
ATTORNEYS Aug. 13, 1957 D. J. YEADON ET AL 2,802,497

APPARATUS FOR STRIPPING BARK

Filed May 18, 1955 8 Sheets-Sheet 2

INVENTORS
Donald J. Yeadon, Leland W. Hooker
and Hereford Garland
BY
Barnes, Kisselle, Laughlin & Raisch
ATTORNEYS Aug. 13, 1957 D. J. YEADON ET AL 2,802,497

APPARATUS FOR STRIPPING BARK

Filed May 18, 1955 8 Sheets-Sheet 3

INVENTORS
Donald J. Yeadon, Leland W. Hooker and Hereford Garland
BY
Barnes, Kisselle, Laughlin & Raisch
ATTORNEYS Aug. 13, 1957 D. J. YEADON ET AL 2,802,497
APPARATUS FOR STRIPPING BARK
Filed May 18, 1955 8 Sheets-Sheet 4
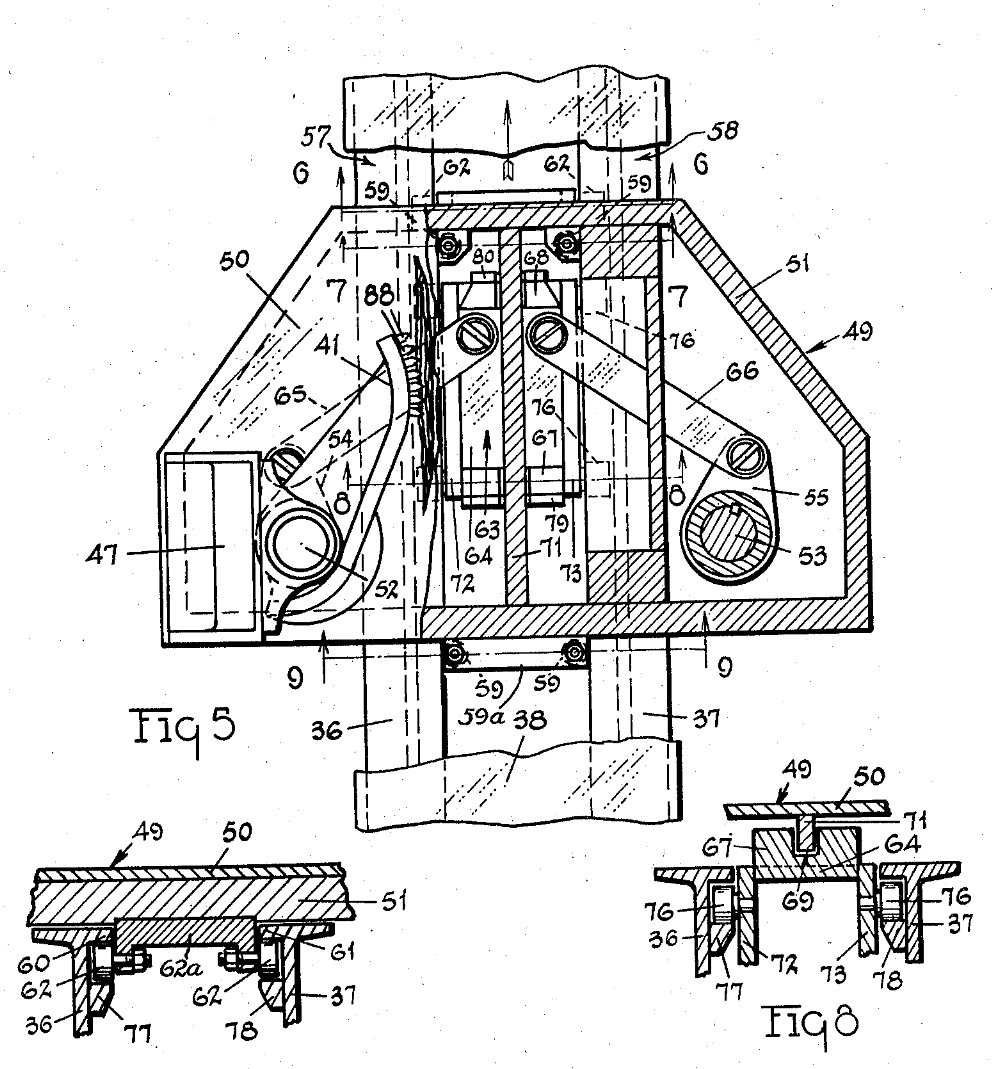
FIG. 5, FIG. 8
FIG. 6
FIG. 9
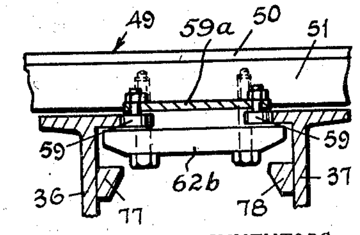
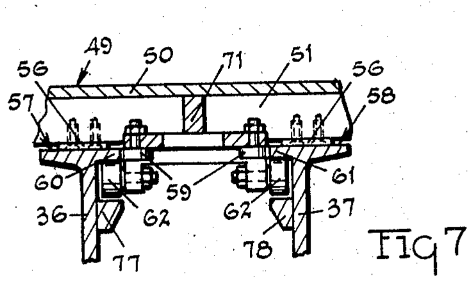
FIG. 7
INVENTORS
Donald J. Yeadon, Leland W. Hooker and Hereford Garland
BY
Barnes, Kisselle, Laughlin & Raisch
ATTORNEYS Aug. 13, 1957 D. J. YEADON ET AL 2,802,497

APPARATUS FOR STRIPPING BARK

Filed May 18, 1955 8 Sheets-Sheet 5

INVENTORS
Donald J. Yeadon, Leland W. Hooker
and Hereford Garland
BY
Barnes, Kisselle, Laughlin & Raisch
ATTORNEYS INVENTORS
Donald J. Yeadon, Leland W. Hooker and Hereford Garland
BY
Barnes, Kisselle, Laughlin & Raisch
ATTORNEYS Aug. 13, 1957 D. J. YEADON ET AL 2,802,497

APPARATUS FOR STRIPPING BARK

Filed May 18, 1955 8 Sheets-Sheet 7

INVENTORS
Donald J. Yeadon, Leland W. Hooker
and Hereford Garland
BY
Barnes, Kisselle, Laughlin & Raisch
ATTORNEYS Aug. 13, 1957 D. J. YEADON ET AL 2,802,497

APPARATUS FOR STRIPPING BARK

Filed May 18, 1955 8 Sheets-Sheet 8

INVENTORS
Donald J. Yeadon, Leland W. Hooker and Hereford Garland
BY
Barnes, Kisselle, Laughlin & Raisch
ATTORNEYS United States Patent Office 2,802,497 Patented Aug. 13, 1957

2,802,497

APPARATUS FOR STRIPPING BARK

Donald J. Yeadon, Leland W. Hooker, and Hereford Garland, Houghton, Mich., assignors to Board of Control of the Michigan College of Mining & Technology Application May 18, 1955, Serial No. 509,302

43 Claims. (Cl. 144—208)

This invention relates to an appaartus for stripping the bark from logs such as pulpwood sticks.

It is an object of this invention to provide an improved apparatus employing the method disclosed and claimed in the patent to Yeadon et al., 2,691,395, issued October 12, 1954. According to this method, a log is moved axially through a knife head having mounted therein a plurality of spring-loaded and radially extending knives. The knives have a configuration such that the bark is cut or slit longitudinally and then subjected to a lateral force to strip it from the log. The shape and arrangement of the knives is such that there is no net lateral force on the log and the log is therefore prevented from rotating during the stripping operation.

It is an object of this invention to provide a bark-stripping apparatus having novel means for moving the log axially through the knife head.

It is a further object of this invention to provide a bark-stripping apparatus having a novel cable means arrangement for supporting the knife head and novel means for automatically aligning the cables symmetrically with the oncoming log, so that as logs of different diameters move through the knife head no radial unbalanced forces act on the knife head.

A further object of the invention is to so construct such cable-aligning means that it will maintain the knife head in alignment with the log until the log has cleared the knife head.

Another object of the invention is to provide a bark-stripping apparatus including a knife head having radially extending and spring-loaded knives and novel means for simultaneously adjusting the spring pressure on the knives for varying the depth of cut of the knives in order to accommodate the apparatus to logs having different thicknesses of bark or for varying the force in accordance with the hardness of the bark.

Basically, the novel means for moving the logs axially through the knife head include a horizontal table on either side of the knife head along which the log is moved. A pair of jaws is mounted for reciprocating movement along each said table. The jaws are caused to grip the log when moving in one direction for moving the log through the knife head and to disengage from the log when moving in the return direction. The movement of the pairs of jaws is timed and adjusted so that one pair of jaws is gripping and moving the log while the other pair of jaws is returning to its original position for gripping a log.

The knife head is vertically supported by a cable carrying a counterweight which enables the knife head to shift vertically and thrust cables are provided for resisting the thrust on the knife head due to the movement of the logs through the knife head. The novel arrangement for adjusting the thrust cables so that they automatically symmetrically align with the end of an oncoming log includes a gate pivotally supported for movement into the path of the oncoming log and means connected to the gate and some of the thrust cables and operable when the gate is contacted by a log to bring the thrust cables into symmetrical alignment with the log.

The novel means for simultaneously adjusting the force on all the knives includes a radially adjustable collar bearing against the end of each spring which applies pressure to a knife and includes associated apparatus for simultaneously adjusting the radial position of the collars.

In the drawings:

Fig. 5 is a fragmentary multiplane sectional plan view along the line 5—5 on Fig. 3.

Fig. 6 is a transverse vertical fragmentary sectional view along the line 6—6 on Fig. 5.

Fig. 7 is a transverse vertical fragmentary sectional view along the line 7—7 on Fig. 5.

Fig. 8 is a transverse vertical fragmentary sectional view along the line 8—8 on Fig. 5.

Fig. 9 is a transverse vertical fragmentary sectional view along hte line 9—9 on Fig. 5.

*Log-feeding mechanism*

Figure 1:
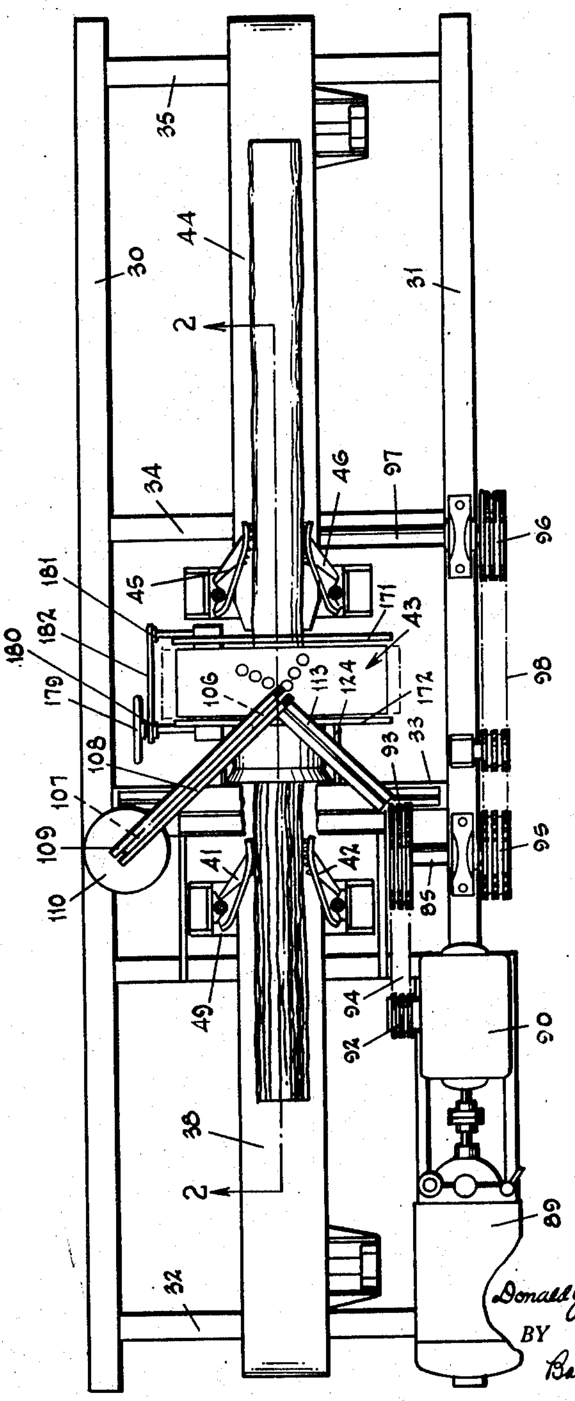
Fig. 1 is a plan view of the bark-stripping apparatus, parts being broken away.
Figure 2:
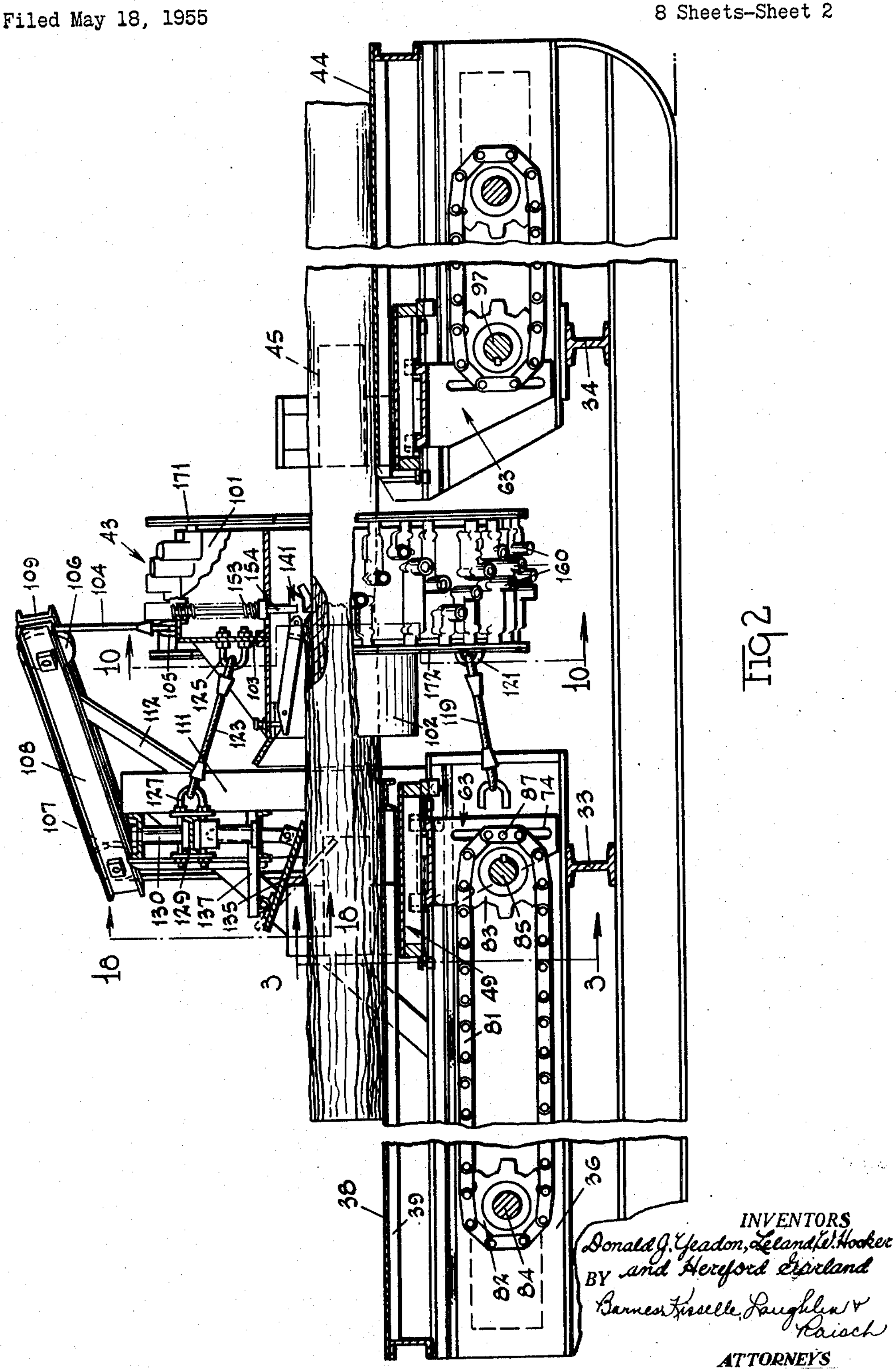
Fig. 2 is an enlarger fragmentary longitudinal elevation along the line 2—2 on Fig. 1.
Figure 3:
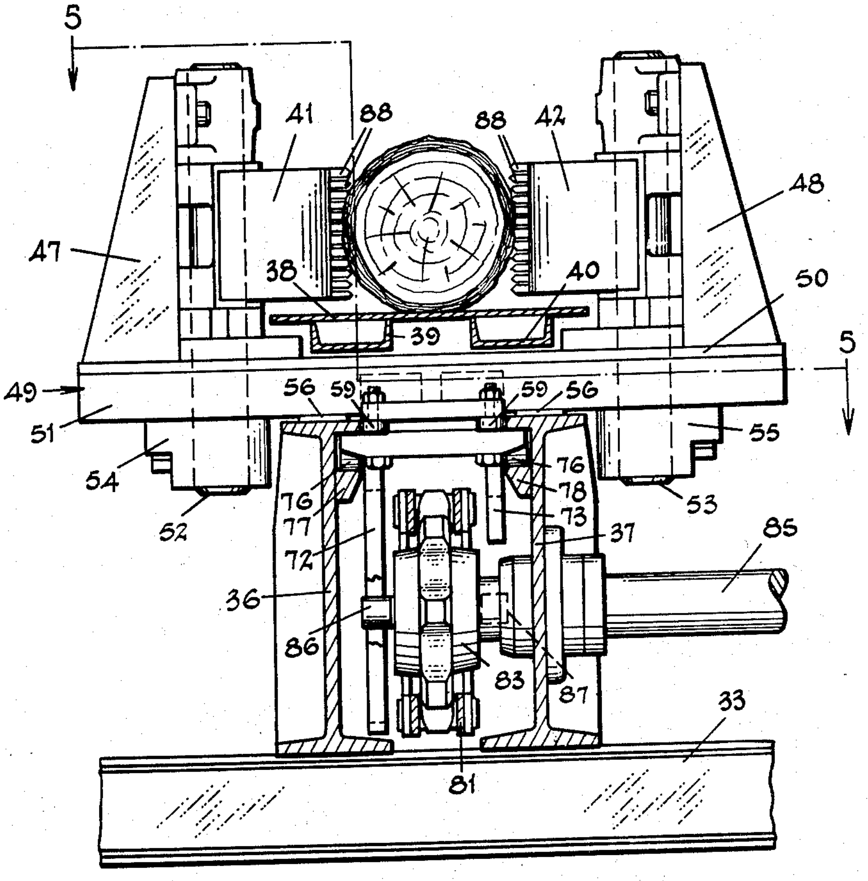
Fig. 3 is a further enlarged fragmentary transverse sectional elevation along the line 3—3 on Fig. 2.

As shown in Figs. 1 and 2, the base of the bark-stripping apparatus comprises longitudinally extending, parallel spaced members 30 and 31 braced by transverse struts 32, 33, 34 and 35. Parallel spaced modified I beams 36, 37 are mounted on the transverse struts and extend longitudinally at one end of the base (Fig. 3). A table 38, reinforced by channels 39 and 40, is mounted in vertically spaced relationship to the I beams 36, 37. A pair of jaws 41, 42, adapted to grip the log and move it along the table 38, are mounted for reciprocating movement longitudinally of the table, gripping the logs when moved in one direction and releasing the grip when moving in the reverse direction.

A knife head 43 is mounted at the end of the table 38 as presently described and a second table 44 is positioned on the other side of the knife head in alignment with the first table 38. The second table 44 is mounted on I beams in a similar manner as the table 38. A pair of jaws 45, 46 are provided for longitudinal movement along the table 44 for pulling the log along the table.

The jaws 41, 42 and 45, 46 are similarly constructed and mounted for movement and to avoid repetition, only the mounting and moving mechanism for jaws 41, 42 will be described.

Referring to Figs. 3 and 5, the jaws 41, 42 are mounted on hinge plates 47, 48, respectively, fixed to a carriage 49 which comprises a flat plate 50 and a peripheral flange 51. The jaws are keyed to shafts 52, 53 which project downwardly through the plate 50 and have cranks 54, 55 keyed thereto. Bearing blocks 56 (Fig. 7) are fixed to the under surface of the carriage and contact machined surfaces 57, 58 of the modified I beams 36, 37 to facilitate the sliding movement of the carriage along the I beams. Rollers 59 are mounted on a plate 59*a* secured to the carriage and are adapted to contact the longitudinal edges of inwardly extending flanges 60, 61 of the I beams and thereby guide the sliding movement of the carriage along the I beams. In addition, as shown in Figs. 5, 6 and 7, rollers 62 are provided at one end of the carriage and are adapted to engage the under surface of the flanges 60 and 61 and thereby maintain the carriage in position on the I beams, preventing its becoming disengaged from the I beams during its travel thereon. The rollers 62 are mounted on a support bar 62*a* secured to the peripheral flange 51. At its opposite end the carriage is provided with a guide bar 62*b* secured as by bolting to the peripheral flange 51.

Figure 4:
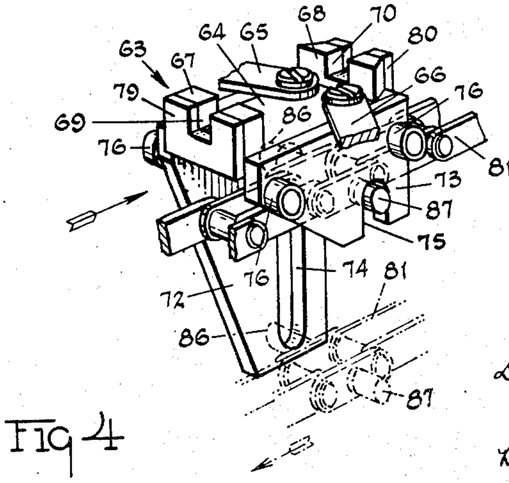
Fig. 4 is a perspective view of the slide assembly for opening and closing the jaws which grip the logs.

A slide assembly 63 is provided to actuate the jaws and move the carriage along the I beams. As shown in Fig. 4, the slide assembly includes a plate 64 on which are pivotally mounted links 65, 66. The ends of the links are pivotally connected to the cranks 54, 55 so that movement of the slide assembly 63 relative to the carriage 49 will rotate the cranks and pivot the jaws inwardly or outwardly. The slide assembly also includes upwardly projecting guide blocks 67, 68 mounted on the plate 64 and provided with slots 69, 70 adapted to contact a guide wall 71 extending longitudinally of the carriage (Fig. 8). In addition, the slide assembly 63 includes a long vertical wall 72 extending downwardly from one side of the plate 64 and a short vertical wall 73 extending downwardly from the other side of the plate 64. A long vertical slot 74 is provided in the long wall 72 and a short open-end slot 75 is provided in the short wall 73. Rollers 76 are mounted on the outside of the walls 72, 73 and are adapted to ride in guideways formed on the I beams 36, 37 by rails 77, 78 which are welded to the inner surfaces of the webs of the I beams and extend longitudinally below the flanges 60, 61 (Fig. 8). By this mounting, the slide assembly has limited longitudinal movement relative to the carriage.

As shown in Fig. 5, movement of the slide assembly in the direction of the arrow will cause rotation of the cranks and movement of the jaws inwardly into gripping relationship with a log on the table. After the jaws grip the log, further movement of the slide assembly relative to the carriage is prevented, and the slide assembly will carry the carriage along with it. If the slide assembly is then moved in the opposite direction, it will initially move relative to the carriage and will cause the jaws to disengage the log. Further movement of the slide assembly in the opposite direction will cause the guide block 67 to contact the flange 51 at the rear end of the carriage and carry the carriage along with the slide and return the carriage and jaws to the initial log-gripping position. In order to cushion the contact of the guide blocks 67, 68 with the flange 51 of the carriage, resilient pads 79, 80 may be adhered to the outer surfaces of the guide blocks.

The movement of the slide assembly is obtained by a chain 81 trained over sprockets 82, 83 which are mounted on shafts 84, 85 passing through and journalled to the I beam 37. At one point along the length of the chain 81, rollers 86, 87 project outwardly from each side of the chain. The roller 86 rides in the long vertical slot 74 of the wall 72 while the roller 87 is adapted to engage the walls of the slot 75 when the rollers are being carried by the chain in the direction in which the logs are to be moved.

The provision of the rollers 86, 87 engaging slots in the walls on either side of the slide assembly insures an equal transmission of force to the slide assembly when a log is being moved along the table. In the return movement of the slide assembly, there is no load on the jaws and therefore only the roller 86 is required to engage and move the slide assembly.

In order to insure a good gripping of the logs, spikes 88 are mounted on the log-gripping surfaces of the jaws.

Referring to Fig. 1, the endless chains which move the slide assembly and in turn the carriage and jaws are driven from a motor 89 which may be of the electric or gasoline type. The motor drives a speed reducer 90 which in turn rotates the shaft 85 on which the sprocket 83 is mounted. The drive to the shaft 85 is by means of a pulley 92 on the gear reducer, a pulley 93 on the shaft 85 and belts 94 trained over the pulleys 92, 93. The endless chain which drives the corresponding slide assembly, jaws and carriage along the second table 44 is driven from the shaft 85 by means of a sprocket 95 mounted on the shaft 85, a sprocket 96 fixed to a shaft 97 driving the sprocket of the endless chain, and chains 98 trained over the sprockets 95, 96. The chains 98 act as timing chains for synchronizing the drive of the jaws 41, 42 and 45, 46. The relative positions of the jaws along their respective tables and the timing of their gripping and disengaging with the log may be adjusted by removing the chains 98 and changing the angular phase relationships of the sprockets 95, 96. The arrangement is timed such that as the jaws 41, 42 reach their limit of movement toward knife head 43 and release their grip on the log, the jaws 45, 46 close to grip the log on the discharge side of head 43 and continue the movement of the log through the knife head.

*Knife-head-supporting means*

Figure 10:
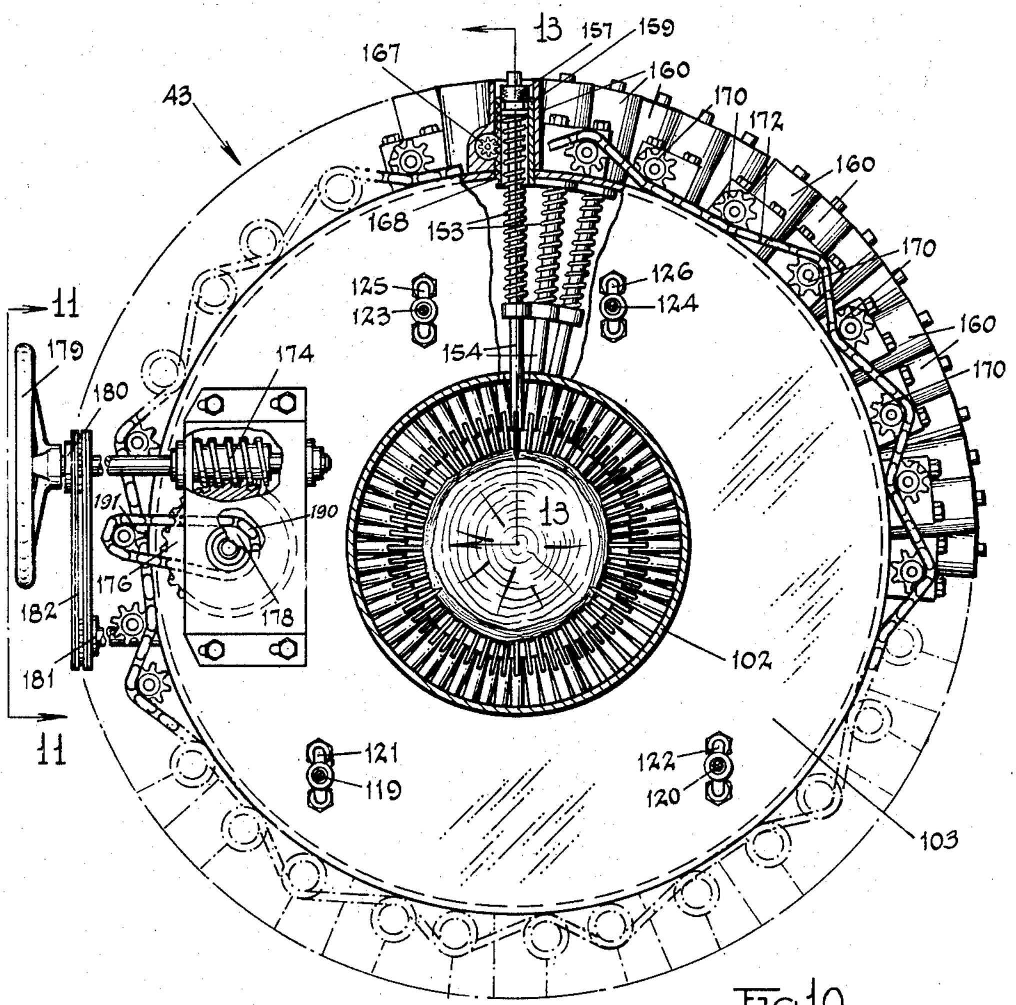
Fig. 10 is a further enlarged sectional transverse elevation of the knife head along the line 10—10 on Fig. 2.

As shown in Figs. 2 and 10 the knife head 43 comprises spaced coaxial cylindrical walls 101, 102. The forward or discharge edges of the cylindrical walls lie in a single plane as shown in Fig. 2, while the inner cylindrical wall 102 is longer than the outer wall 101, projecting toward the rear of the machine. An annular ring 103 is fastened to the cylindrical walls to complete the housing for the knife head.

The knife head is mounted for transverse movement relative to the longitudinal axis of the machine by a cable 104 secured at one end to a bracket 105 on the top of the outer cylindrical wall 101. The cable passes over pulleys 106, 107 rotatably mounted between two channel sections 108, 109 and a counterbalance weight 110 is fastened to the other end of the cable. The channel sections 108 and 109 extend upwardly and forwardly of the machine and are supported by a vertical strut 111 and braces 112 on the one side of the machine, and an upwardly extending member 113 welded to a vertical strut 114 on the other side of the machine. As showing Fig. 18, cross struts 115, 116 extend between the vertical struts 111, 114. Short vertical members 117, 118 extend between the cross struts and further strengthen the structure.

*Knife-head-thrust equalizing means*

Figures 18, 19, 20:
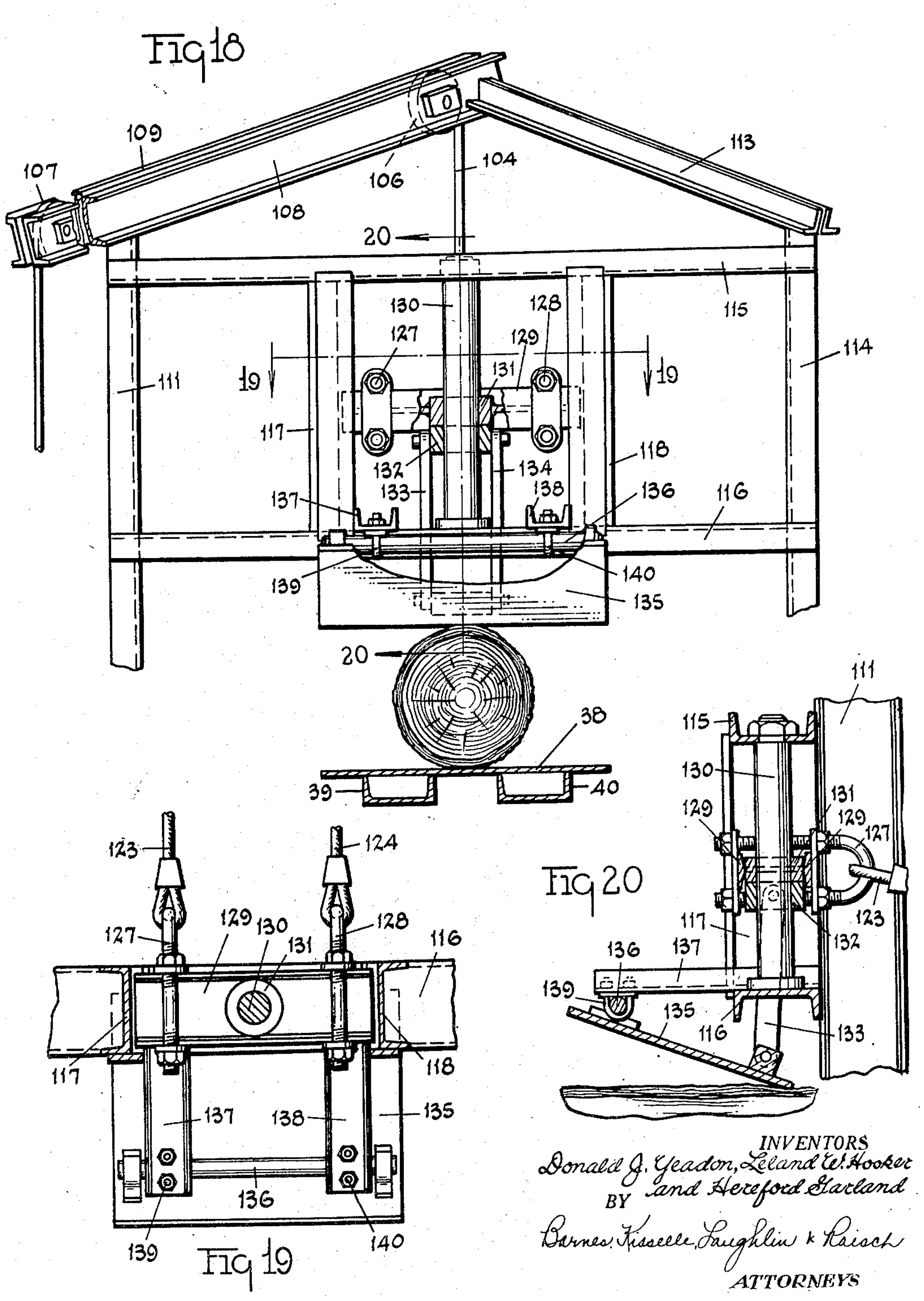
Fig. 18 is a further enlarged fragmentary transverse sectional elevation along the line 18—18 on Fig. 2, parts being broken away.
Fig. 19 is a fragmentary horizontal longitudinal sectional view along the line 19—19 on Fig. 18.
Fig. 20 is a fragmentary vertical longitudinal sectional view along the line 20—20 on Fig. 18.

A pair of thrust cables 119, 120 (see Figs. 2 and 10) are connected by U bolts 121, 122, respectively, to the lower end of the head. The other end of the cables 119, 120 are fastened to the webs of the I beams 36, 37 but only the connection to the I beam 36 is shown (see Fig. 2). Means are provided for adjusting the position of the knife head to accommodate different size logs and includes thrust cables 123, 124 connected at one end to U bolts 125, 126, respectively, on the upper portion of the annular wall 103 of the knife head. The other ends of the cables 123, 124 extend to U bolts 127, 128 clamped to a transverse member 129 which is vertically slidable on a column 130 extending between cross struts 115, 116 (Figs. 19, 20). A bearing block in the form of a collar 131 is mounted on the member 129. Column 130 extends through the collar 131. A second collar 132 is positioned below the bearing block 131 and slides freely on the column 130. Links 133, 134 are pivoted to the collar 132 at the upper ends thereof and to a gate 135 (Fig. 20) at the lower ends thereof. The gate 135 is fixed to a shaft 136 for limited swinging movement, the shaft 136 extending horizontally and transversely of the machine and being journaled beneath the unsupported rear ends of short cantilevers 137, 138 by means of small U bolts 139, 140. The gate 135 extends downwardly and forwardly into the path of and in the direction of movement of the logs through the knife head. When contacted by the leading end of an oncoming log, the gate is swung upwardly, forcing collar 132 upwardly on the column 130 by means of the links 133, 134. This, in turn, causes the member 129 to be moved upwardly and the rear ends of cables 123, 124 are likewise shifted upwardly. The lower end of gate 135 will move a distance vertically of the axis of the log equal to the amount that the diameter of the log exceeds the initial gap between the forward end of the gate and the table. This movement of the gate produces an upward movement of member 129 such that, as the knife head aligns itself axially with the log, as the log passes through it, as hereinafter described, cables 123, 124 and cables 119, 120 are aligned symmetrically with respect to the axis of the log; and therefore substantially the same amount of tension is applied to both sets of thrust cables. Thus, no radial unbalanced forces are applied to the knife head.

In addition, by this construction, the tendency for the immediate return of the knife head to its original position when the trailing end of the log clears the gate 135 is prevented and delayed until the end of the log has passed the knife head. After the log clears the end of the gate, the gate drops downwardly carrying with it the links 133, 134 and the collar 132. However, the movement of the log through the knife head maintains tension on the thrust cables 123, 124 which are slightly inclined, thus cocking collar 131 on column 130 and preventing it from sliding downwardly on the column 130 until the end of the log clears the knife head and releases the tension in the thrust cables.

*Means for mounting the spring-pressed bark-removing knives*

Figures 13, 17:
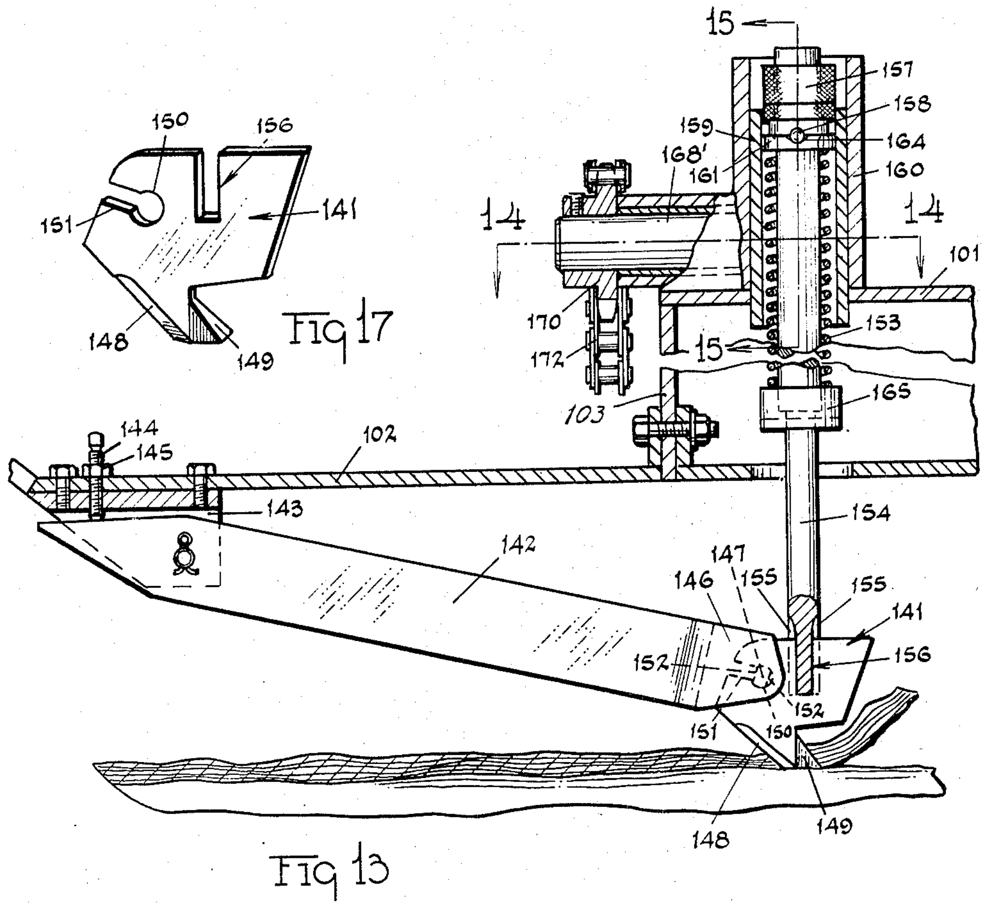
Fig. 13 is a still further enlarged fragmentary longitudinal sectional view along the line 13—13 on Fig. 10.
Fig. 17 is an enlarged detail perspective view of the knife.

Referring to Fig. 13, each of the knives 141 is supported for movement radially of the knife head by an arm 142 pivotally mounted on the inner surface of the inner cylindrical wall 102 by a bracket 143. The downward movement of the arm 142 is limited by a setscrew 144 passing through the inner cylindrical wall and contacting the end of the arm. A lock nut 145 is provided to lock the setscrew in position. The free end of each arm is bifurcated as at 146 to receive a knife 141. A pin 147 extends across the bifurcation and pivotally supports the knife blade 141. As a log enters the knife head, the knife head is shifted into axial alignment with the log by reason of the funneling action of the knife arms 142 when they are struck by the end of the log.

As shown in Fig. 17, the knife blade includes a cutting edge 148 for slitting the bark and a wing 149 for applying a lateral force to the slit bark. In addition, the knife is formed with a round hole 150 from one side of which extends a slot 151. The shank of the pin 147 is provided with a pair of opposed flat faces 152 spaced to correspond to the width of slot 151 so that the knife may be mounted on the end of the arm 142 by aligning the slot 151 with the flat faces 152, slipping the knife over the pin and thereafter rotating the knife on the pin to the operative position wherein the slot 151 is disposed transversely of the flat faces 152.

Each of the knives is individually biased to swing radially inwardly of the knife head by a spring 153 supported on a guide rod 154 extending through a longitudinal slot in the inner wall 102. The inner end of each guide rod 154 is formed with diametrically opposed grooves 155 which interengage a slotted portion 156 of the knife 141 to hold the knife in operative position. The other end of each guide rod 154 is loosely guided by a collar 157. The collar 157 is adapted to engage a pair of diametrically opposed pins 158 mounted on a sleeve 159 slidable within a guide tube 160 fixed on the housing.

Figure 15:
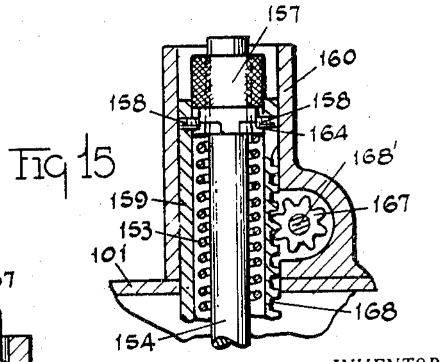
Fig. 15 is a fragmentary transverse sectional elevation along the line 15—15 on Fig. 13.
Figure 16:
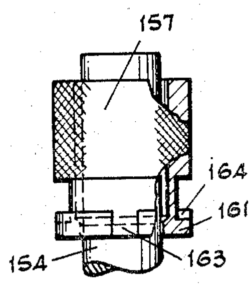
Fig. 16 is an enlarged detail elevation of the collar for maintaining the spring pressure on the knives, parts being broken away.

As shown in Figs. 15 and 16, the collar 157 at its inner end includes a flange 161 having diametrically opposed cutaway portions or axially extending notches 163 and small diametrically opposed and radially extending grooves or seats 164 on the outer surface of the flange 161, the seats 164 being spaced 90° from the notches 163. When it is desired to assemble the collar, it is slipped downwardly over the upper end of the guide rod 154 with the notches 163 in alignment with the pins 158 and then rotated relative to the sleeve to bring the pins into interengagement with the seats 164. The spring 153 acts between the flange 161 of the collar and a bushing 165 fixed on the rod 154.

Figure 14:
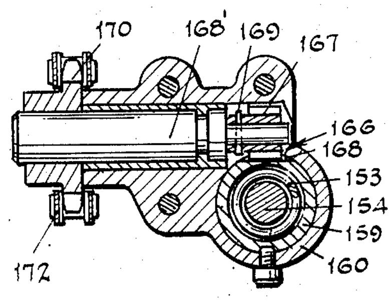
Fig. 14 is a sectional view along the line 14—14 on Fig. 13.

Means are provided for adjusting the position of the sleeve 159 and in turn of the collar 157 relative to the tube 160 in order to increase or decrease the spring force on the knives and thereby adjust the cutting force of the knives to accommodate logs of different types of materials, wherein the bark is of different thicknesses or hardness. As shown in Figs. 14, 15 and 16, this includes a slot 166 in the wall of each tube 160 and having mounted therein a pinion 167 adapted to engage a rack 168 formed on each sleeve 159 whereby rotation of the pinions will move the sleeves 159 relative to the tubes 160. Each pinion 167 is fixed to a shaft 168' by means of a pin 169. The shaft is rotatably mounted in a journal housing which is attached to or is formed with the tube 160 and a sprocket 170 is fixed to the other end of the shaft 168'.

Figure 12:
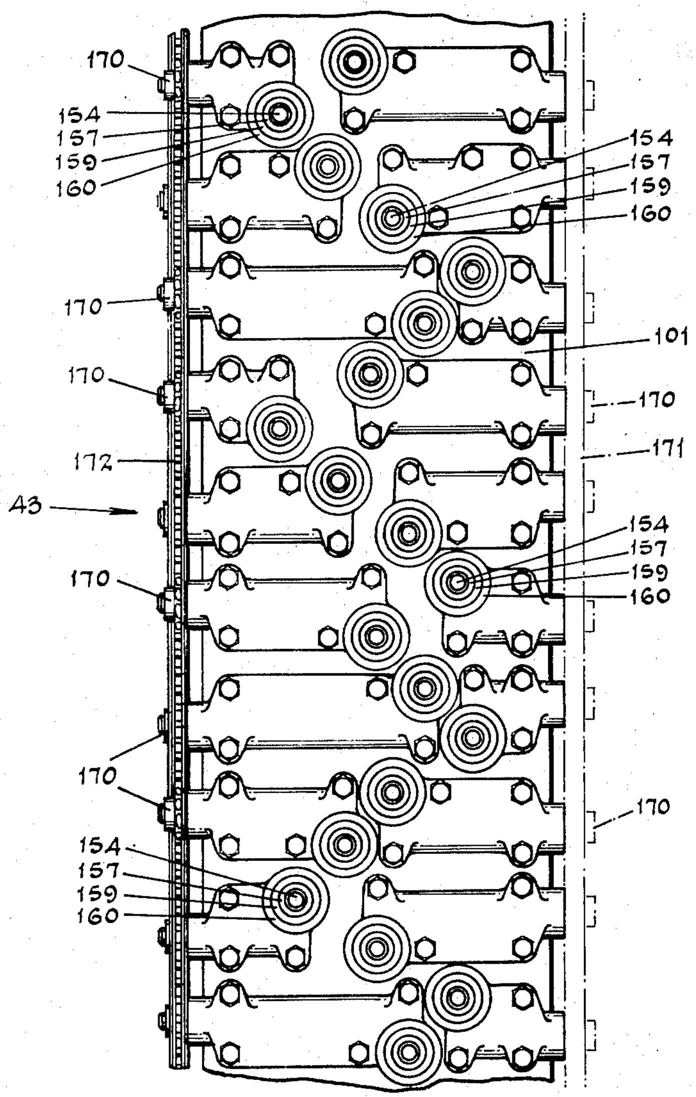
Fig. 12 is a schematic development of a portion of the periphery of the knife head.

As shown in Figs. 10 and 12 each of the knives is constructed in the same manner and a plurality of tubes and journal housings are positioned in properly spaced relationship on the outer surface of the outer wall 101 of the knife head.

As clearly set forth in U. S. Patent 2,691,395, a specific staggered arrangement of the knives is preferred in order to provide best results.

*Means for simultaneously changing the spring pressure on all knives*

Provision is also made for simultaneously adjusting the spring force on all of the knife blades. As shown in Fig. 12, some of the sprockets 170 are arranged to project beyond one edge of the outer cylindrical wall 101 while others of the sprockets project beyond the outer edge of the cylindrical wall. A chain 171 is trained over one set of the sprockets and a chain 172 is trained over the other set. In order to obtain the simultaneous movement and adjustment, the chains not only must be rotated simultaneously, but one chain must be rotated in one direction and the other in the opposite direction.

Figure 11:
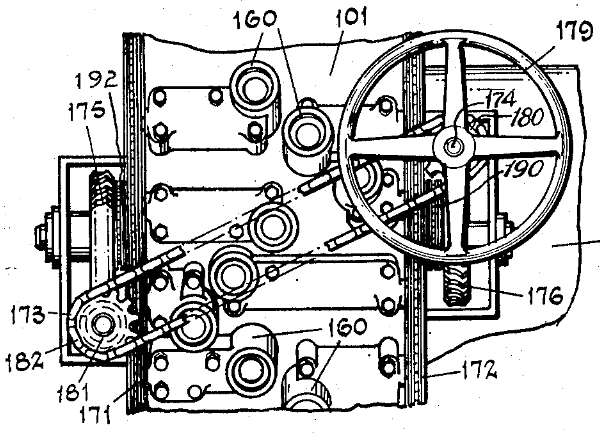
Fig. 11 is a fragmentary side view or longitudinal elevation of the knife head as seen from the viewing line 11—11 on Fig. 10.

As shown in Figs. 10 and 11, this is accomplished by mounting a gear box on either side of the cylindrical wall 101. Each gear box includes a worm 173 (or 174) and a worm gear 175 (or 176) journalled therein, and a sprocket 178 fixed to the shaft of the worm gear 176 (a corresponding sprocket on the worm gear 175 not being illustrated). Each of the chains 171, 172 is operatively connected with the sprocket in its respective gear box, for example, by a chain 190 trained over the sprocket 178 and driving a double sprocket 191 meshing with the chain 172 (Fig. 10), and by a chain 192 trained over the non-illustrated sprocket of the worm gear 175 and over another double sprocket (also not illustrated) which corresponds to the sprocket 191 and drives the chain 171. A handwheel 179 is fastened to the shaft of one of the worms in order to provide for manual adjustment and sprockets 180, 181 on the worm shafts 174 and 173, respectively, are connected by a chain 182 in order that both worms will be rotated at the same time. The movement of the chains 171, 172 in opposite directions is achieved by having one worm contact its worm gear at one point and the other worm contact its worm gear at a point 180° with respect to the first worm (Fig. 11).

*Operation*

The operation of the bark-stripping apparatus may be summarized as follows: When it is desired to use the machine, the motor 89 is operated to continuously drive the endless chains 81 and reciprocate the two sets of jaws 41, 42 and 45, 46 alongside their respective tables. The connections between the driving mechanism are preferably such that when one pair of jaws is gripping a log to move it through the knife head, the other pair is returning to its original position for gripping.

When a log is placed on table 38, it is gripped by the jaws 41, 42 and carried forwardly in the machine. As the forward end of the log strikes the gate 135, the gate is swung upwardly, symmetrically aligning the thrust cables for the diameter of the log entering the knife head. The knife head comes into axial alignment with the log by the funneling action of the knife-supporting arms 142 over the end of the log. The log is moved through the knife head by the jaws 41, 42 until the jaws reach the end of their forward movement and the grip on the log is released. Simultaneously with the release by the jaws 41, 42, the log is gripped by the jaws 45, 46 alongside the second table 44; and the log is then pulled through the knife head. Depending upon the length of the log, the two pairs of jaws grip and regrip the log, alternately, to push and pull it through the knife head. It is preferable that the logs be of such a length that only one reciprocation is needed by each pair of jaws to move the log completely through the knife head.

As the log passes the gate 135, the gate drops downwardly; but the knife head remains in its axially aligned position due to the tension on the thrust cables 123, 124. After the log has passed entirely through the knife head, the tension on the thrust cables is relieved; and member 129 (Fig. 19) returns to its original position. The knife head being slightly heavier than its counterbalance will also return to its original position. The individual mounting of each knife on the pivoted arm 142 permits the knives to pass over the end of the log as the log is initially moved through the knife head and in addition, to pass over obstructions in the log. The pivotal mounting of the knives on the arms permits the stripping of bark from logs of varying sizes without any further adjustment of the apparatus. The smallest size log that may be stripped is controlled by the initial setting of the arms 142 by means of the setscrews 144 which limit the radially inward position of the arms 142. It will be noted that the knife head is supported such that it is free to shift laterally and thereby accommodate crooked logs.

In the event that it is desired to change the depth of cutting of the knives in order to accommodate the apparatus to logs having bark of different thicknesses or hardness, the handwheel 179 is rotated, simultaneously adjusting the spring pressure on each of the knives.

In the event that the logs being stripped are exceedingly crooked, it may be desirable to adjust the operation of the jaws so that the grip on the logs is released by one pair of jaws before the other pair is operated to grip the log. In this manner, excessive or unusual lateral movement of the knife head will be prevented.

We claim:

1. An apparatus for stripping bark from a log comprising a table along which a log may be moved axially, a knife head at one end of said table including a plurality of knives pivotally supported within said head and arranged circumferentially around said head, said knives being adapted to extend radially inwardly toward the axis of a log being moved along the table and strip bark from such a log, a second table in alignment with the first table and positioned on the other side of said knife head, and means individual to each said table and movable along said tables to engage and move a log along said tables.

2. The apparatus set forth in claim 1, said means for engaging and moving a log along each said table comprising a carriage mounted for reciprocating movement in a path parallel to the desired path of such a log, a pair of jaws mounted for swinging movement with relation to said carriage and adapted to grip a log therebetween, means for reciprocating said carriage, and means for moving said jaws into gripping position when the carriage is moving in one direction and for moving said jaws out of gripping position when the carriage is moving in the opposite direction.

3. The apparatus set forth in claim 1, said means for engaging and moving a log along each said table comprising a carriage mounted for reciprocating movement in a path parallel to the desired path of such a log, a pair of jaws mounted for swinging movement with relation to said carriage and adapted to grip a log therebetween, means for reciprocating said carriage, and means responsive to the change in direction of movement of said carriage for actuating the jaws into and out of gripping position.

4. The apparatus set forth in claim 1, said means for engaging and moving a log along each said table including a carriage mounted for reciprocating movement in a path parallel to the path of such a log, a pair of jaws mounted on said carriage and swingable with relation thereto into and out of gripping position, a slide assembly mounted for relative movement with respect to said carriage, means connecting said slide assembly to said jaws whereby when the slide assembly is moved with relation to said carriage, the jaws are swung into and out of log-gripping position, and means for reciprocating said slide assembly whereby when the slide assembly is moved in one direction, said assembly initially moves relative to the carriage and swings the jaws into log-gripping position and thereafter moves the carriage in unison with the movement of the slide assembly, and when said slide assembly is moved in the opposite direction, it swings the jaws out of gripping position and thereafter moves the carriage in unison with the movement of the slide assembly.

5. The apparatus set forth in claim 1, said means for gripping and moving a log comprising a carriage, means below said table for supporting said carriage for longitudinal sliding movement relative to the table, a pair of jaws swingably mounted on said carriage for movement into and out of gripping relationship with a log, a slide assembly mounted for relative movement with respect to the carriage, means connecting said slide assembly to said jaws whereby when a slide assembly is moved with respect to the carriage, the jaws are swung into or out of log-gripping position, an endless chain, sprockets on which said endless chain is trained, said sprockets being mounted for rotation about horizontal axes, means for connecting said endless chain to said slide assembly whereby reciprocating movement of the slide assembly is achieved, so that initial movement of the slide assembly in one direction relative to the carriage will cause the jaws to swing inwardly into log-gripping position and further movement of the slide assembly will carry the jaws and carriage along therewith, and subsequent movement of the slide assembly in the opposite direction by the endless chain will initially cause a relative movement of the slide assembly with respect to the carriage and swing the jaws out of log-gripping position and thereafter cause the carriage to be moved in unison with the slide assembly to the initial position.

6. The apparatus set forth in claim 5 wherein said means for connecting the jaws to said slide assembly comprise a crank arm fixed to each said jaw, and a link pivotally connected to said crank arm and pivotally connected to said slide assembly.

7. The apparatus set forth in claim 5, said means for connecting the endless chain to the slide assembly comprising a vertical slot in said slide assembly, and a roller attached to the chain and adapted to engage and ride in said slot.

8. The apparatus set forth in claim 5, said slide assembly comprising a plate and means for guiding the movement of said plate; said means for connecting the slide assembly to said jaws comprising a link individual to each said jaw and pivotally mounted on said plate, each said link being pivotally connected to its respective jaw; and said means for connecting the endless chain to the slide assembly comprising a vertical wall projecting downwardly from one side of said plate and overlapping both runs of said endless chain and having a long vertical slot therein, and a roller mounted on said chain and adapted to have continuous engagement with the walls of said vertical slot.

9. The apparatus set forth in claim 8 including means for equally applying a driving force from the endless chain to the slide assembly during movement of the latter in said one direction comprising a second vertical plate mounted on the slide and extending downwardly therefrom, said second plate having a vertical slot therein, and a second roller on the endless chain opposite the first roller adapted to engage the walls of said vertical slot in the second wall.

10. The apparatus set forth in claim 9 wherein said second wall is shorter than the first wall and the vertical slot therein has a downwardly open end, whereby the second roller engages said vertical slot in the second wall only when the slide assembly is moving in said one direction.

11. An apparatus for stripping bark from a log comprising a table along which a log may be moved axially, a vertically shiftable knife head at one end of said table, said knife head including a plurality of knives arranged circumferentially around said head and adapted to strip bark from a log moved through the knife head, means for shifting the knife head vertically into axial alignment with an oncoming log, means for resisting the thrust of said knife head due to the movement of a log therethrough comprising a supporting structure fixed relative to said table and spaced axially from said knife head, a plurality of links extending between and connecting said head and said supporting structure, the connection between said supporting structure and at least one of said links being vertically shiftable on said supporting structure to vary the inclination of said one link, and means on said table disposed in the path of movement of a log and engageable by a proximate end of an oncoming log to vertically shift said connection between the supporting structure and said one link.

12. The apparatus called for in claim 11 wherein said last-mentioned means comprises a gate supported for swinging movement and means connecting said gate with said one connection whereby said one connection is shifted vertically in response to swinging movement of said gate.

13. The apparatus called for in claim 12 wherein said links comprise cables.

14. The apparatus called for in claim 12 wherein said supporting structure includes an upright member, a member vertically slidable on said upright member, said one link being anchored on said vertically slidable member, and means forming an operative connection between said gate and said slidable member.

15. The apparatus called for in claim 14 wherein said last-mentioned means includes a second member vertically slidable on said upright member and positioned below said first slidable member, and link means extending between said gate and said second slidable member whereby when the gate swings upwardly the second slidable member moves the first slidable member upwardly and when the gate swings downwardly the second slidable member moves downwardly but the first slidable member remains in its adjusted position on said upright member because of the tension placed on said links by movement of a log through said head.

16. An apparatus for stripping bark from a log comprising a table along which a log may be moved axially, a vertically shiftable knife head at one end of said table, said knife head including a plurality of knives arranged circumferentially around said head and adapted to strip bark from a log moved through the knife head, means for shifting the knife head vertically into axial alignment with an oncoming log, means for resisting the thrust on said knife head due to the movement of a log therethrough comprising a supporting structure fixed relative to said table and spaced axially from said head, a pair of links connected at one end with the lower part of the head and at the other end with said supporting structure, a second pair of links connected at one end to the upper part of the head and at the other end to said supporting structure, at least one pair of said links having their connections with said supporting structure vertically shiftable, link-actuating means on said table positioned in the path of movement of a log being advanced toward said head, said link-actuating means being movable by engagement with a log an extent proportional to the diameter of such a log, and means forming an operative connection between said link-actuating means and said vertically movable link connections for shifting said movable connections vertically an extent such that when the head is shifted into axial alignment with such a log said two sets of links are oppositely inclined to the horizontal substantially the same extent whereby the head will not be subjected to unbalanced forces tending to shift the head when such a log is moved therethrough.

17. The apparatus called for in claim 16 wherein said head is provided with a plurality of pivotally supported arms connected to said knives, said arms extending generally radially inwardly and in the direction of movement of a log through the head to strip bark, and wherein means are provided for biasing said arms radially inwardly such that their inner free ends normally define a circle having a diameter less than the diameter of a log to be stripped, said arms forming a funnel-shaped guide for a proximate end of an oncoming log, and said biasing means being of sufficient strength such that said head is shifted vertically into substantial axial alignment with such a log when such proximate end strikes said arms and before said arms pivot outwardly against the resistance of said biasing means.

18. An apparatus for stripping bark from logs comprising a support along which a log may be moved axially, a knife head at one end of said support, said knife head comprising an inner cylindrical wall, an outer cylindrical wall coaxial therewith and spaced therefrom, a plurality of arms pivotally mounted on the inner surface of the inner cylindrical wall for movement in a direction toward and away from a longitudinal axis of a log, a knife mounted at the free end of each said arm, means for biasing each said knife radially inwardly, and means for simultaneously adjusting the biasing force on all said arms.

19. The apparatus set forth in claim 18, said means for applying a biasing force to each said knife comprising a rod connected to said knife, said inner wall having an elongated slot extending longitudinally therethrough and through which said rod passes, an opening in said outer cylindrical wall into which the end of the rod loosely projects, a bushing fixed to said rod, a coil spring mounted on said rod and a collar compressing said spring and adjustably mounted relative to the outer cylindrical wall.

20. The apparatus set forth in claim 19, said means for adjustably mounting the collar relative to the outer cylindrical wall comprising a tube surrounding the opening in the outer cylindrical wall, a sleeve slidable in said tube, means connecting said collar to said sleeve, and means for adjusting the position of said sleeve relative to said tube.

21. The apparatus set forth in claim 20, said means for adjusting the position of said sleeve relative to said tube comprising a rack on said sleeve, said tube having an opening adjacent said rack, and a pinion rotatably mounted with respect to said tube and meshing with said rack.

22. The apparatus set forth in claim 21, said means for simultaneously adjusting the position of all of the sleeves comprising a sprocket, connected to each of said pinions, and means for simultaneously rotating each of said sprockets.

23. The apparatus set forth in claim 22 wherein said sprockets comprise at least two groups lying in radial planes, a chain individual to each said group trained over the sprockets in each radial plane, and means for simultaneously driving the chains.

24. The apparatus set forth in claim 20, said means connecting said collar to said sleeve including diametrically opposed pins mounted in said sleeve and projecting radially inwardly, said collar including a flange at the lower end thereof, said flange having diametrically opposed cutaway portions, whereby the pins in the sleeve and the cutaway portions of the collar may be aligned and the collar moved inwardly and rotated to engage the pins with the flange.

25. The apparatus set forth in claim 24, said flange of the collar having grooves on an upper surface thereof adapted to receive the pins.

26. In an apparatus for handling logs, the combination of a table along which a log may be moved axially, means at one end of said table for performing an operation on a log, a second table in alignment with the first table and positioned on the other side of said means, and means individual to each table and movable along said tables to engage and move a log along said tables, said last-mentioned means comprising a pair of carriages mounted one on each of said tables for reciprocating movement in a path parallel to the desired path of a log, a pair of jaws mounted on each carriage for swinging movement and adapted to grip a log therebetween, means for reciprocating said carriages, and means for moving each pair of jaws into gripping position when its respective carriage is moving in one direction and for moving each pair of jaws out of gripping position when its respective carriage is moving in the opposite direction.

27. In an apparatus for handling logs, the combination of a table along which a log may be moved axially, means at one end of said table for performing an operation on a log, a second table in alignment with the first table and positioned on the other side of said means, means individual to each table and movable along said tables to engage and move a log along said tables, a carriage mounted on each of said tables for reciprocating movement in a path parallel to the path of a log, a pair of jaws mounted on each of said carriages and swingable into and out of gripping position with a log therebetween, a slide assembly associated with each of said carriages and movable relative to its carriage, means connecting each slide assembly with the jaws on its respective carriage whereby when the slide assembly is moved in opposite directions relative to its respective carriage, the jaws thereon are swung into and out of log-gripping position, and means for reciprocating said slide assemblies simultaneously in opposite directions, whereby when one slide assembly is moved in one direction, said one slide assembly initially moves relatively to its carriage to swing the jaws thereon into gripping position and thereafter moves the carriage and a log gripped by said jaws along said table and when said one slide assembly is moved in the opposite direction it swings said last-mentioned jaws out of gripping position and thereafter moves the carriage in said opposite direction.

28. In an apparatus for handling logs, the combination of a table along which a log may be moved axially, means at one end of said table for performing an operation on a log, a second table in alignment with the first table and positioned on the other side of said means, means individual to each table and movable along said tables to engage and move a log along said tables, said means for gripping and moving a log comprising a pair of carriages mounted one on each of said tables, means below said tables for supporting said carriages for longitudinal sliding movement on said tables, a pair of swingable jaws mounted on each of said carriages for movement into and out of gripping relationship with a log, a slide assembly associated with each carriage and movable relative thereto, means connecting each slide assembly with its respective set of jaws such that when the slide assembly is moved in opposite directions relative to its carriage the jaws are swung into and out of log-gripping position, and means for reciprocating said slide assemblies simultaneously in opposite directions, whereby when one of said slide assemblies is moved toward said means for performing an operation on a log, the jaws associated with said last-mentioned slide are in gripping relationship with such a log and are moving toward said last-mentioned means and the other slide assembly is also moving in a direction toward said last-mentioned means but the jaws thereon are out of gripping relationship with such a log.

29. In an apparatus for handling logs, the combination of a table along which a log may be moved axially, means at one end of said table for performing an operation on a log, a second table in alignment with the first table and positioned on the other side of said means, means individual to each table and movable along said tables to engage and move a log along said tables, said means for engaging and moving a log along each said table comprising a carriage mounted for reciprocating movement in a path parallel to the desired path of such a log, a pair of jaws mounted for swinging movement with relation to said carriage and adapted to grip a log therebetween, means for reciprocating said carriage, and means responsive to the change in direction of movement of said carriage for actuating the jaws into and out of gripping position.

30. In an apparatus for handling logs, the combination of a table along which a log may be moved axially, means at one end of said table for performing an operation on a log, a second table in alignment with the first table and positioned on the other side of said means, means individual to each table and movable along said tables to engage and move a log along said tables, said means for gripping and moving a log comprising a carriage, means below said table for supporting said carriage for longitudinal sliding movement relative to the table, a pair of jaws swingably mounted on said carriage for movement into and out of gripping relationship with a log, a slide assembly mounted for relative movement with respect to the carriage, means connecting said slide assembly to said jaws whereby when a slide assembly is moved with respect to the carriage, the jaws are swung into or out of log-gripping position, an endless chain, sprockets on which said endless chain is trained, said sprockets being mounted for rotation about horizontal axes, means for connecting said endless chain to said slide assembly whereby reciprocating movement of the slide assembly is achieved, so that initial movement of the slide assembly in one direction relative to the carriage will cause the jaws to swing inwardly into log-gripping position and further movement of the slide assembly will carry the jaws and carriage along therewith, and subsequent movement of the slide assembly in the opposite direction by the endless chain will initially cause a relative movement of the slide assembly with respect to the carriage and swing the jaws out of log-gripping position and thereafter cause the carriage to be moved in unison with the slide assembly to the initial position.

31. The apparatus set forth in claim 30 wherein said means for connecting the jaws to said slide assembly comprise a crank arm fixed to each said jaw, and a link pivotally connected to said crank arm and pivotally connected to said slide assembly.

32. The apparatus set forth in claim 30, said means for connecting the endless chain to the slide assembly comprising a vertical slot in said slide assembly, and a roller attached to the chain and adapted to engage and ride in said slot.

33. The apparatus set forth in claim 30, said slide assembly comprising a plate and means for guiding the movement of said plate; said means for connecting the slide assembly to said jaws comprising a link individual to each said jaw and pivotally mounted on said plate, each said link being pivotally connected to its respective jaw; and said means for connecting the endless chain to the slide assembly comprising a vertical wall projecting downwardly from one side of said plate and overlapping both runs of said endless chain and having a long vertical slot therein, and a roller mounted on said chain and adapted to have continuous engagement with the walls of said vertical slot.

34. The apparatus set forth in claim 33 including means for equally applying a driving force from the endless chain to the slide assembly during movement of the latter in said one direction comprising a second vertical plate mounted on the slide and extending downwardly therefrom, said second plate having a vertical slot therein, and a second roller on the endless chain opposite the first roller adapted to engage the walls of said vertical slot in the second wall.

35. The apparatus set forth in claim 34 wherein said second wall is shorter than the first wall and the vertical slot therein has a downwardly open end, whereby the second roller engages said vertical slot in the second wall only when the slide assembly is moving in said one direction.

36. In an apparatus for handling logs, the combination comprising a table along which a log may be moved axially, a vertically shiftable head at one end of said table for performing an operation on a log, means for shifting said head vertically into axial alignment with an oncoming log, means for resisting the thrust of said head due to the movement of a log therethrough comprising a supporting structure fixed relative to said table and spaced axially from said head, a plurality of links extending between and connecting said head and supporting structure, the connection between said supporting structure and at least one of said links being vertically shiftable on said supporting structure to vary the inclination of said one link, and means on said table disposed in the path of movement of a log and engageable by a proximate end of an oncoming log to vertically shift said connection between the supporting structure and said one link.

37. The apparatus called for in claim 36 wherein said last-mentioned means comprises a gate supported for swinging movement, and means connecting said gate with said one connection whereby said one connection is shifted vertically in response to swinging movement of said gate.

38. The apparatus called for in claim 36 wherein said links comprise cables.

39. The apparatus called for in claim 36 wherein said supporting structure includes an upright member, a member vertically slidable on said upright member, said one link being anchored on said vertically slidable member, and means forming an operative connection between said gate and said slidable member.

40. The apparatus called for in claim 39 wherein said last-mentioned means includes a second member vertically slidable on said upright member and positioned below said first slidable member, and link means extending between said gate and said second slidable member whereby when the gate swings upwardly the second slidable member moves the first slidable member upwardly and when the gate swings downwardly the second slidable member moves downwardly but the first slidable member remains in its adjusted position on said up-right member because of the tension placed on said links by movement of a log through said head.

41. In an apparatus for handling logs, the combination comprising a table along which a log may be moved axially, a vertically shiftable head at one end of said table for performing an operation on a log, means, for shifting said head vertically into axial alignment with an oncoming log, means for resisting the thrust of said head due to the movement of a log therethrough comprising a supporting structure fixed relative to said table and spaced axially from said head, a pair of links connected at one end with the lower part of the head and at the other end with said supporting structure, a second pair of links connected at one end to the upper part of the head and at the other end to said supporting structure, at least one pair of said links having their connections with said supporting structure vertically shiftable, link-actuating means on said table positioned in the path of movement of a log being advanced toward said head, said link-actuating means being movable by engagement with a log an extent proportional to the diameter of such a log, and means forming an operative connection between said link-actuating means and said vertically movable link connections for shifting said movable connections vertically an extent such that when the head is shifted into axial alingment with such a log said two sets of links are oppositely inclined to the horizontal substantially the same extent whereby the head will not be subjejcted to unbalanced forces tending to shift the head when such a log is moved therethrough.

42. In an apparatus for handling logs, the combination of a table along which a log may be moved axially, means at one end of said table for performing an operation on a log, a second table in alignment with the first table and positioned on the other side of said means, log-gripping means individual to each table and movable along said tables to engage and move a log along said tables, and means for moving said log-gripping means simultaneously in opposite directions along said table.

43. The combination set forth in claim 42 including means for actuating each said log-gripping means for bringing said log-gripping means into and out of engagement with a log, and means for actuating said latter means to cause said log-gripping means to engage a log when said log-gripping means is moved in one direction and to cause said log-gripping means to disengage a log when said log-gripping means is moved in the opposite direction.

References Cited in the file of this patent

UNITED STATES PATENTS

| | | |
|---|---|---|
| 1,440,042 | Whalley | Dec. 26, 1922 |
| 2,389,556 | Siegerist | Nov. 20, 1945 |
| 2,492,321 | Roberts | Dec. 27, 1949 |